(12) United States Patent
Pak et al.

(10) Patent No.: US 9,466,843 B2
(45) Date of Patent: Oct. 11, 2016

(54) ELECTRODE CATALYST AND METHOD OF PREPARING ELECTRODE CATALYST FOR FUEL CELL, AND MEMBRANE ELECTRODE ASSEMBLY AND FUEL CELL INCLUDING SAME

(75) Inventors: Chan-ho Pak, Seoul (KR); Dae-jong Yoo, Seoul (KR); Hyuk Chang, Seongnam-si (KR); Dong-jin Ham, Anyang-si (KR); Sueng-hoon Han, Busan (KR); Gang-hong Bae, Changwon-si (KR); Jae-sung Lee, Pohang-si (KR)

(73) Assignees: SAMSUNG ELECTRONICS CO., LTD. (KR); POSTECH ACADEMY-INDUSTRY FOUNDATION (KR)

( * ) Notice: Subject to any disclaimer, the term of this patent is extended or adjusted under 35 U.S.C. 154(b) by 792 days.

(21) Appl. No.: 13/190,850

(22) Filed: Jul. 26, 2011

(65) Prior Publication Data
US 2012/0028171 A1    Feb. 2, 2012

(30) Foreign Application Priority Data

Jul. 30, 2010    (KR) .................... 10-2010-0074388

(51) Int. Cl.
| H01M 4/90 | (2006.01) |
| H01M 4/92 | (2006.01) |
| H01M 4/88 | (2006.01) |
| H01M 8/10 | (2016.01) |

(52) U.S. Cl.
CPC ............. *H01M 4/92* (2013.01); *H01M 4/8803* (2013.01); *H01M 4/8817* (2013.01); *H01M 4/921* (2013.01); *H01M 4/925* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 5,746,803 | A | 5/1998 | Dunmead et al. |
| 6,297,185 | B1* | 10/2001 | Thompson et al. ........... 502/101 |
| 6,447,742 | B1 | 9/2002 | Lackner et al. |
| 2003/0059666 | A1 | 3/2003 | Kourtakis |
| 2007/0079905 | A1 | 4/2007 | Gerk |
| 2007/0269707 | A1* | 11/2007 | Lee et al. ........................ 429/44 |
| 2009/0263646 | A1 | 10/2009 | Gerk et al. |
| 2010/0129728 | A1* | 5/2010 | Morimoto et al. ........... 429/483 |
| 2011/0053039 | A1 | 3/2011 | Pak et al. |
| 2011/0081599 | A1 | 4/2011 | Lee et al. |
| 2011/0274989 | A1* | 11/2011 | Lu et al. ........................ 429/405 |

FOREIGN PATENT DOCUMENTS

| EP | 1 842 589 | 10/2007 |
| JP | 59-107007 | 6/1984 |
| JP | 2000-203825 | 7/2000 |
| JP | 2000-512688 | 9/2000 |
| JP | 2004510668 A | 4/2004 |
| JP | 2006-12773 | 1/2006 |
| JP | 200766908 A | 3/2007 |
| KR | 10-2004-0040466 | 5/2004 |
| KR | 10-2007-0001062 | 1/2007 |
| KR | 1020070006097 A | 1/2007 |
| KR | 10-0687729 | 2/2007 |
| KR | 10-2007-0099272 | 10/2007 |
| KR | 10-2007-0099935 | 10/2007 |
| KR | 10-2009-0078911 | 7/2009 |
| WO | WO 99/42213 | 8/1999 |
| WO | WO 02/28773 | 4/2002 |
| WO | 2008136264 A1 | 11/2008 |

OTHER PUBLICATIONS

English-language abstract of 10-2007-0006097 from Korean Patent Abstracts.
Nie, Ming et al., "Nanocrystaline tungsten carbide supported Au-Pd electrocatalyst for oxygen reduction", *Journal of Power Sources*, 167 (2007), pp. 69-73.
Wu, Mei et al., "High activity PtPd-WC/C electrocatalyst for hydrogen evolution reaction", *Journal of Power Sources*, 166 (2007), pp. 310-316.
European Search Report dated Oct. 31, 2011, issued in corresponding European Patent Application No. 11175997.3-2119.
WO 99/42213, cited in the European Search Report (AM), was previously submitted in the Information Disclosure Statement filed Jul. 26, 2011.
Claudio Bianchini et al., Palladium-Based Electrocatalysts for Alcohol Oxidation in Half Cells and in Direct Alcohol Fuel Cells, 2009, pp. 4183-4206, 109, American Chemical Society.
Korean office action for application no. 10-2010-0074388 mailed on Mar. 24, 2016.

* cited by examiner

*Primary Examiner* — Maria J Laios
(74) *Attorney, Agent, or Firm* — Cantor Colburn LLP

(57) ABSTRACT

An electrode catalyst for a fuel cell, a membrane electrode assembly including the electrode catalyst, and a fuel cell including the electrode catalyst. The electrode catalyst has excellent electrochemical activity compared to the currently commercially available Pt/C catalyst and is much cheaper than a catalyst using platinum. The electrode catalyst includes tungsten carbide having a specific surface area of about 10 to about 30 m$^2$/g, and a metal catalyst comprising palladium (Pd) or palladium alloy.

14 Claims, 7 Drawing Sheets

ELECTRODE CATALYST AND METHOD OF PREPARING ELECTRODE CATALYST FOR FUEL CELL, AND MEMBRANE ELECTRODE ASSEMBLY AND FUEL CELL INCLUDING SAME

CROSS-REFERENCE TO RELATED APPLICATION

This application claims the benefit of Korean Patent Application No. 10-2010-0074388, filed on Jul. 30, 2010 in the Korean Intellectual Property Office, the disclosure of which is incorporated herein in its entirety by reference.

BACKGROUND

1. Field

Aspects of the present disclosure relate to electrode catalysts that are used in a fuel cell, membrane electrode assemblies and fuel cells including the electrode catalysts, and methods of preparing the electrode catalysts.

2. Description of the Related Art

A fuel cell contains an electrolyte disposed between two electrodes, which are generally formed of porous metal or carbon. Such a fuel cell is also referred to as a single cell. Hydrogen gas or another fuel is supplied to an anode from outside the fuel cell, reaches a reaction region through pores of the electrode, and turns into dissociated hydrogen atoms by being adsorbed to a catalyst in the electrode. The active hydrogen atoms turn into protons, and two electrons are transmitted to the electrode. The electrons are transferred to a cathode, which is on the opposite side of the anode, through an external circuit. Accordingly, a current is generated by the fuel cell. Water is generated at the cathode due to oxygen supplied from outside the fuel cell, the protons transported through the electrolyte, and the electrons transmitted through the external circuit reacting with each other.

An anode in a polymer electrolyte membrane fuel cell (PEMFC) may include a platinum catalyst to accelerate a reaction that generates protons by oxidizing hydrogen gas. For example, a supported catalyst may include platinum and molybdenum carbide or tungsten carbide covering a part or the whole area of the surface of a support. However, platinum is expensive and in limited supply, and thus, the use of platinum hinders widespread commercialization of such fuel cells. In order to reduce the amount of a platinum catalyst used, carbonaceous materials that have a large specific surface area and are conductive may be used as a support, and the specific surface area of a platinum catalyst is increased by uniformly depositing minute platinum particles on the support. However, the weight of a platinum catalyst component is generally 40 to 80 wt % based on the entire weight of a supported catalyst, and thus, such fuel cells are expensive.

SUMMARY

Aspects of the present invention provide electrode catalysts that have excellent hydrogen oxidizing activity and are cheaper than a platinum catalyst.

Aspects of the present invention provide membrane electrode assemblies for a fuel cell that include the electrode catalysts.

Aspects of the present invention provide fuel cells that incorporate electrodes containing the electrode catalysts or incorporate the membrane electrode assemblies.

Methods are provided for preparing the electrode catalysts.

An aspect of the present invention provides an electrode catalyst, the electrode catalyst including tungsten carbide having a specific surface area of about 10 to about 30 m$^2$/g, and a metal catalyst comprising palladium (Pd) or palladium alloy.

Based on the total weight of the electrode catalyst, the amount of the tungsten carbide may be in the range of about 60 to about 95 wt % and the amount of the metal catalyst may be in the range of about 5 to about 40 wt %.

The metal catalyst may include palladium (Pd) and at least one other metal selected from the group consisting of nickel (Ni), iridium (Ir), ruthenium (Ru), cobalt (Co), manganese (Mn), gold (Au), iron (Fe), and silver (Ag). The weight ratio of the palladium (Pd) to the other metal may be in the ratio range of about 66.7:33.3 to about 99.999:0.001.

The metal catalyst may include palladium (Pd), and two of the other metals. The first other metal may be selected from the group consisting of nickel (Ni), cobalt (Co), manganese (Mn), iron (Fe) and silver (Ag), and the second other metal may be selected from the group consisting of iridium (Ir), ruthenium (Ru) and gold (Au). The weight ratio of the palladium (Pd) to the first other metal to the second other metal may be in the ratio range of about 66.7:33.2:0.1 to about 99.998:0.001:0.001. The metal catalyst may include palladium (Pd) and at least one other metal selected from the group consisting of nickel (Ni) and iridium (Ir).

The tungsten carbide may include amorphous carbon that is outside of the lattice structure of the tungsten carbide, and the amount of the amorphous carbon may be in the range of about 0.1 wt % or less based on the weight of the tungsten carbide.

Another aspect of the present invention provides an electrode catalyst, the electrode catalyst including tungsten carbide comprising amorphous carbon in the range of about 0.1 parts by weight or less based on the 100 parts by total weight of the tungsten carbide, and a metal catalyst comprising palladium (Pd) or palladium alloy.

The amorphous carbon is outside of the crystal lattice structure of the tungsten carbide.

Based on the total weight of the electrode catalyst, the amount of the tungsten carbide may be in the range of about 60 to about 95 wt % and the amount of the metal catalyst is in the range of about 5 to about 40 wt %.

The metal catalyst may include palladium (Pd) and at least one other metal selected from the group consisting of nickel (Ni), iridium (Ir), ruthenium (Ru), cobalt (Co), manganese (Mn), gold (Au), iron (Fe), and silver (Ag). The weight ratio of the palladium (Pd) to the other metal may be in the ratio range of about 66.7:33.3 to about 99.999:0.001.

The metal catalyst may include palladium (Pd) and two of the other metals. The first other metal may be selected from the group consisting of nickel (Ni), cobalt (Co), manganese (Mn), iron (Fe) and silver (Ag), and the second other metal may be selected from the group consisting of iridium (Ir), ruthenium (Ru) and gold (Au). The weight ratio of the palladium (Pd) to the first other metal to the second other metal may be in the ratio range of about 66.7:33.2:0.1 to about 99.998:0.001:0.001. The metal catalyst may include palladium (Pd) and at least one other metal selected from the group consisting of nickel (Ni) and iridium (Ir).

Another aspect of the present invention provides an electrode including the electrode catalyst similar to those disclosed above.

Another aspect of the present invention provides a membrane electrode assembly (MEA) for a fuel cell, the MEA comprising a cathode and an anode facing each other and an electrolyte membrane interposed between the cathode and the anode, wherein at least one of the cathode and the anode includes an electrode catalyst similar to those disclosed above. The electrode may be an anode.

Another aspect of the present invention provides a fuel cell comprising an electrode incorporating an electrode catalyst similar to those described above. The electrode may be an anode.

The tungsten carbide may serve as a support and may be particles having an average particle size from about 0.01 to about 100 μm.

The tungsten carbide support may include a plurality of pores having a diameter in a range of about 2 to about 5 nm and a volume in a range of about 0.08 to about 0.25 cm$^3$/g.

The fuel cell may be a polymer electrolyte membrane fuel cell (PEMFC).

Another aspect of the present invention provides a method of preparing the electrode catalyst according to an aspect of the present invention, the method comprising: refluxing a mixture including tungsten carbide having a specific surface area of about 10 to about 30 m$^2$/g, a metal catalyst precursor comprising palladium (Pd), and a solvent, and separating the product obtained by the refluxing.

The mixture may be obtained by mixing a tungsten carbide dispersion in which the tungsten carbide is dispersed in a first mixed solvent with a metal catalyst precursor solution, wherein the tungsten carbide has a specific surface area of about 10 to about 30 m$^2$/g, and the metal catalyst precursor includes a palladium (Pd) precursor and at least one other metal precursor selected from the group consisting of a nickel (Ni) precursor, an iridium (Ir) precursor, a ruthenium (Ru) precursor, a cobalt (Co) precursor, a manganese (Mn) precursor, a gold (Au) precursor, an iron (Fe) precursor, and a silver (Ag) precursor.

In the refluxing, the precursor mixture may be refluxed at a pressure of about 1 to about 5 atm and at a temperature of about 120 to about 180° C. so that the metal catalyst comprising palladium (Pd) or palladium alloy and at least one other metals selected from the group consisting of nickel (Ni), iridium (Ir), ruthenium (Ru), cobalt (Co), manganese (Mn), gold (Au), iron (Fe), and silver (Ag) may be loaded on the tungsten carbide.

The tungsten carbide may be obtained by heat treating the tungsten carbide/carbon composite in the presence of ammonia gas or urea gas so as to remove amorphous carbon that is outside of the crystal lattice of the tungsten carbide contained in the tungsten carbide/carbon composite.

The heat treatment temperature may be in a range of about 500 to about 1,500° C.

The tungsten carbide may have a specific surface area of about 10 to about 30 m$^2$/g, and may include amorphous carbon that that is outside of the crystal lattice of the tungsten carbide tungsten carbide, wherein the amount of the remaining amorphous carbon may be 0.1 wt % or less based on the weight of the tungsten carbide.

The first mixed solvent may include a polyol and at least one polar solvent selected from the group consisting of water, a C1-C4 aliphatic alcohol, and a C1-C4 aliphatic ketone.

The metal catalyst component precursor solution may be a solution in which the metal catalyst precursor is dissolved in the second solvent of water alone or in an alternative the second mixed solvent comprising water and at least one polar solvent selected from the group consisting of a C1-C4 aliphatic alcohol, a C1-C4 aliphatic ketone, and a polyol like a ethylene glycol.

Based on 1 part by weight of the tungsten carbide, the amount used of the first mixed solvent may be in a range of about 10 to about 200 parts by weight, and in the first mixed solvent, the mixed ratio of the polyol to the polar solvent may be in the range of about 10 to about 100 parts by weight based on 100 parts by weight of the polyol.

Based on 100 parts by weight of the second solvent of water alone or the mixed solvent, the amount of the metal catalyst precursor may be in a range of about 0.3 to about 15 parts by weight, and in the mixed solvent, the mixing ratio of the polar solvent may be in a range of about 10 to about 30 parts by weight based on 100 parts by weight of water.

The amounts of the palladium precursor and the other metal precursors in the mixture may be controlled such that the atomic ratio of the palladium to the other metals selected from the group consisting of nickel (Ni), iridium (Ir), ruthenium (Ru), cobalt (Co), manganese (Mn), gold (Au), iron (Fe), and silver (Ag) is in a range of about 3:3 to about 3:1.

Still another aspect of the present invention provides a method of preparing the electrode catalyst comprising: refluxing a mixture including tungsten carbide comprising amorphous carbon in the range of about 0.1 parts by weight or less based on the 100 parts by total weight of the tungsten carbide, a metal catalyst comprising palladium (Pd) or palladium alloy, and a solvent, and separating the product obtained by the refluxing.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
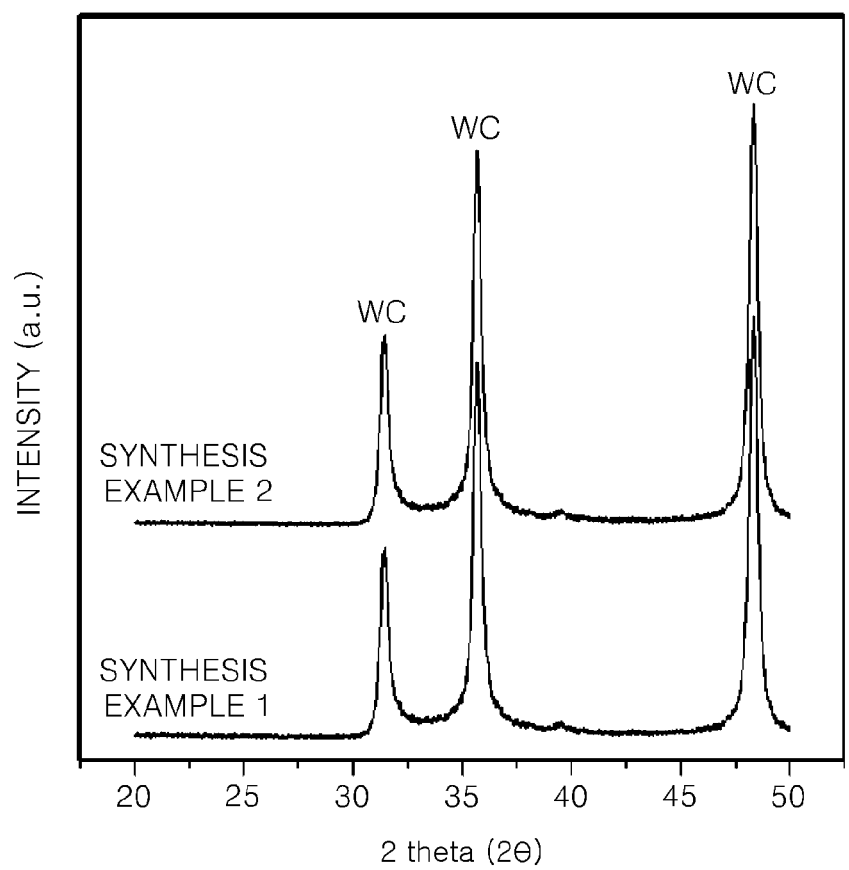
FIG. 1 shows X-ray diffraction results of a tungsten carbide/carbon composite prepared according to Synthesis Example 1 and tungsten carbide, from which amorphous carbon is removed, prepared according to Synthesis Example 2.

Reference will now be made in detail to the present embodiments of the present invention, examples of which are illustrated in the accompanying drawings. The embodiments are described below, by referring to the figures, to explain aspects of the present invention.

An electrode catalyst for a fuel cell according to an embodiment of the present invention includes tungsten carbide and a catalyst component.

The tungsten carbide may have a specific surface area of about 10 to about 30 $m^2/g$, for example, about 15 to about 25 $m^2/g$ or about 16 to about 19 $m^2/g$. For example, the tungsten carbide may have a specific surface area of about 18 to about 19 $m^2/g$. The specific surface areas described above are very different from the specific surface area of 100 to 200 $m^2/g$ of tungsten carbide disclosed in Korean Patent Publication No. 2007-0006097. The tungsten carbide used herein has a specific surface area much smaller than the specific surface area of the tungsten carbide disclosed in the cited reference above for the following reason. That is, unlike the cited reference, in the present embodiment, the tungsten carbide is used after carbon deposited thereon is removed, instead of directly using the tungsten carbide prepared by hydrothermal synthesis. The tungsten carbide with a high specific surface area disclosed in the cited reference is prepared by a preparation method including: (a) dissolving a polymerizable monomer and a tungsten precursor in a solvent and mixing the components; (b) preparing a tungsten-polymer composite in which a polymer generated by polymerizing the monomer is combined with the tungsten precursor; and (c) isolating and calcining the tungsten-polymer composite. The tungsten carbide of the reference is in fact a tungsten carbide/carbon composite in which amorphous carbon that is outside of the crystal lattice of the tungsten carbide is at least locally deposited on a surface of the tungsten carbide. Thus, due to the existence of the amorphous carbon that is not combined with tungsten, the overall specific surface area is as high as from about 100 to about 200 $m^2/g$.

Unlike the tungsten carbide disclosed in the cited reference, the tungsten carbide according to the present embodiment is prepared by further heat treating the tungsten carbide/carbon composite in the presence of ammonia gas or urea gas so that the amorphous carbon in the tungsten carbide/carbon composite is substantially removed. That is, the tungsten carbide includes only 0.1 weight (wt) % or less, for example, 0.05 wt % or less, or 0.04 wt % or less of amorphous carbon. Since the tungsten carbide may not include amorphous carbon in theory, the lower limit of the amount of the amorphous carbon may be 0 wt %. However, in reality, the lower limit of the amount of the amorphous carbon may be 0.001 wt %. In this regard, the amount of the amorphous carbon is the amount of carbon exceeding a theoretical carbon amount of tungsten carbide, that is, 6.12 wt % (that is, amorphous carbon that is outside of the tungsten carbide crystal lattice), and may be evaluated by elemental analysis. Since the tungsten carbide according to the present embodiment does not include substantial amounts of amorphous carbon deposited on the surface of the tungsten carbide, the specific surface area of the tungsten carbide is as low as from about 10 to about 30 $m^2/g$, for example, from about 15 to about 25 $m^2/g$ or from about 16 to about 19 $m^2/g$. At first, it was expected that the tungsten carbide according to the present embodiment might have lower catalytic activity than the conventional tungsten carbide with the high specific surface area due to the smaller specific surface area of the tungsten carbide according to the present embodiment. However, contrary to this expectation, the tungsten carbide according to the present embodiment had a higher catalytic activity than the tungsten carbide with the high specific surface area. This may be due to the fact that the removal of the amorphous carbon may lead to a newly exposed surface of the tungsten carbide and the newly exposed surface of the tungsten carbide may exhibit a strong electrochemical synergy when the catalyst component and the tungsten carbide are used together.

The particle size of the tungsten carbide may not be as limited. For example, the tungsten carbide may have an average particle size of about 0.01 to about 100 μm, for example, about 0.05 to about 50 μm. If the average particle size of the tungsten carbide is less than 0.01 μm, particles may easily agglomerate together. On the other hand, if the average particle size of the tungsten carbide is greater than 100 μm, the specific surface area of the tungsten carbide is small and the catalytic activity may be reduced. In general, the tungsten carbide may include a plurality of pores each having a diameter of 2 nm to 5 nm and a volume of about 0.08 to about 0.25 $cm^3/g$. Meanwhile, in an electrode catalyst, a metal catalyst component may be supported by the tungsten carbide. That is, the tungsten carbide may act as a support having a surface on which a metal catalyst component, such as palladium, nickel, or iridium, is located, and may induce a strong electrochemical synergy when used together with the metal catalyst component. However, the structure of an electrode catalyst is not limited thereto.

In the electrode catalyst according to the present embodiment, based on the total weight of the electrode catalyst, the amount of the tungsten carbide may be in the range of about 60 to about 95 wt %, for example, about 70 to about 90 wt % or about 75 to about 85 wt %, and the amount of the catalyst component may be in the range of about 5 to about 40 wt %, for example, about 10 to about 30 wt %, or about 15 to about 25 wt %. The catalyst component may include i) palladium (Pd); and ii) at least one other metal selected from the group consisting of nickel (Ni), iridium (Ir), ruthenium (Ru), cobalt (Co), manganese (Mn), gold (Au), iron (Fe), and silver (Ag). For example, the catalyst component may include: i) palladium (Pd); and ii) at least one other metal selected from the group consisting of nickel (Ni) and iridium (Ir). For example, the catalyst component may be palladium-nickel, palladium-iridium, or palladium-iridium-nickel. If the catalyst component includes palladium (Pd) and one of the other metals, the weight ratio of the palladium (Pd) to the other metals may be in the ratio range of about 66.7:33.3:0.001. If the catalyst component includes palladium (Pd) and nickel (Ni) and is supported by the tungsten carbide, the amount of Ni may be much smaller than that of palladium. If the catalyst component includes palladium (Pd) and at least one metal catalyst component selected from the group consisting of iridium (Ir), ruthenium (Ru), cobalt (Co), manganese (Mn), gold (Au), iron (Fe), and silver (Ag) and is supported by the tungsten carbide, the amount of iridium (Ir), ruthenium (Ru), cobalt (Co), manganese (Mn), gold (Au), iron (Fe) and silver (Ag) supported by the tungsten carbide may be controlled according to the particular purpose. In the cases described above, transmission electron microscopic (TEM) pictures of the electrode catalysts show that palladium-nickel, palladium-iridium, or the like is uniformly supported by the tungsten carbide. If the catalyst component includes palladium (Pd) and two of the other metals, the ratio ranges of palladium (Pd to the first of the other metals to the second of the other metals may be in the ratio range of about 66.7:33.2:0.1 to about 99.998:0.001:0.001.

An electrode catalyst for a fuel cell, in which a catalyst component such as palladium-nickel, palladium-iridium, or palladium-iridium-nickel is supported by the tungsten carbide has an electrochemical activity that is comparable to that of expensive platinum. For example, the electrode catalyst has high activity as an anode catalyst of a polymer electrolyte membrane fuel cell. This may be due to the fact that when palladium or the tungsten carbide is used separately, the electrode catalyst has a poor hydrogen oxidizing capability. On the other hand, when a combination of: i) palladium (Pd); and ii) at least one or two metal catalyst components selected from the group consisting of nickel (Ni), iridium (Ir), ruthenium (Ru), cobalt (Co), manganese (Mn), gold (Au), iron (Fe), and silver (Ag) is supported by the tungsten carbide, a strong synergy may occur in terms of a hydrogen oxidizing capability. Such a strong electrochemical synergy effect was found by the inventors and will be described in detail later in the examples. Accordingly, when an electrode catalyst including the tungsten carbide and a combination of palladium and other kinds of metal catalyst components is used, a fuel cell may be manufactured at low costs.

The inventors found that the tungsten carbide disclosed in the cited reference above is a tungsten carbide/carbon composite, not pure tungsten carbide, since a great amount of amorphous carbon covers the surface of the tungsten carbide. The inventors also found that carbon, which is a catalytically inactive material, hinders contact of the metal catalyst component and the tungsten carbide and thus reduces the activity and stability of the metal catalyst component with respect to hydrogen oxidization. In order to effectively remove the amorphous carbon from the tungsten carbide/carbon composite while not damaging the lattice structure of the tungsten carbide, the inventors treated the tungsten carbide with ammonia gas or urea gas at high temperature. By doing so, the amorphous carbon was effectively removed.

A membrane electrode assembly (MEA) for a fuel cell according to another embodiment of the present invention includes a cathode, an anode, and an electrolyte membrane interposed between the cathode and the anode, wherein the anode includes an electrode catalyst according to a previously disclosed embodiment of the present invention.

A fuel cell according to yet another embodiment of the present invention includes an electrode incorporating the electrode catalyst according to a previously disclosed embodiment of the present invention described above or the MEA according to a previously disclosed embodiment of the present invention. The fuel cell may be a polymer electrolyte membrane fuel cell (PEMFC).

Hereinafter, a method of preparing tungsten carbide and an electrode catalyst for a fuel cell, according to another embodiment of the present invention, will be described in detail.

(1) Preparation of Tungsten Carbide/Carbon Composite

First, a method of preparing a tungsten carbide/carbon composite will be described in detail.

The tungsten carbide/carbon composite may be prepared by: (a) mixing a solution with a surfactant solution to prepare a mixture, in which the solution is obtained by dissolving a polymerizable monomer and a tungsten precursor in a solvent; (b) preparing a tungsten-polymer composite by hydrothermally synthesizing the mixture, wherein, in the tungsten-polymer composite, the tungsten precursor, and a polymer generated by polymerizing the monomer are combined with each other; and (c) separating and calcining the tungsten-polymer composite.

The above method will now be described in detail, according to each operation.

(a) Mixing Reactants

Here, the polymerizable monomer is not specifically limited as long as it is polymerized within the proper temperature range. Examples of the polymerizable monomer include resorcinol/formaldehyde, phenol/formaldehyde, pyrrole, thiophene, and vinyl chloride, but are not limited thereto. The monomer may be polymerized into a polymer through a radical polymerization mechanism, an ionic polymerization mechanism, or the like. When resorcinol and formaldehyde are used as the monomers, the resorcinol and the formaldehyde form a copolymer through a dehydration condensation reaction.

Also, the type of the tungsten precursor is not limited as long as the tungsten precursor is a compound that includes a tungsten atom and is able to provide the tungsten atom via calcination. The tungsten precursor may be a tungstate or tungsten compound because they can yield a tungsten atom even when calcination conditions are not excessively severe. Examples of the tungsten precursor include ammonium metatungstate (AMT), ammonium tungstate, sodium tungstate, tungsten chloride, and mixtures thereof, but are not limited thereto.

The solvent may be a polar solvent, and for example, may be water or an alcohol-based solvent. Examples of the alcohol-based solvent include methanol; ethanol; or propanol, such as iso-propanol; isomers of butanol; or isomers of pentanol. The water may be deionized water.

The molar ratio of the tungsten precursor to the monomer may be from about 1:5 to about 1:200. When the amount of polymerizable monomer is too high, the amount of amorphous carbon increases, and when the amount of monomer is too low, tungsten carbide having insufficient carbon may be generated.

The molar ratio of the tungsten precursor to the solvent may be from about 1:500 to about 1:3000. When the amount of solvent is less than the above molar ratio, the tungsten precursor and the monomer (reactants) may not be sufficiently mixed, and when the amount of solvent is greater than the above molar ratio, the concentration of the reactants may be too low and the reactants may unsuitably react.

The type of the surfactant is not limited as long as it forms pores. The surfactant increases dispersibility of the tungsten precursor, and surrounds the tungsten-polymer composite including the tungsten precursor and the polymer formed from the monomer so that the particle size of the tungsten-polymer composite decreases. Such small particles aggregate with each other due to high surface energy. Here, the internal space of the tungsten-polymer composite increases due to the surfactant, and thus pores are formed in the tungsten-polymer composite as the surfactant is removed during calcination.

Examples of the surfactant include a cationic surfactant, such as $CH_3(CH_2)_{n-1}N(CH_3)_3Br$ (here, n=10, 12, 14, or 16); an anionic surfactant, such as $CH_3(CH_2)_{n-1}COOH$ (here, n=11, 13, or 15); a neutral surfactant, such as $CH_3(CH_2)_{n-1}NH_2$ (here, n=12 or 16); and a nonionic surfactant, such as $CH_3(CH_2)_{15}(PEO)_{n-1}H$ (here, n=2 to 20 and PEO stands for polyethylene oxide). However, aspects of the present invention are not limited thereto. For example, a triblock copolymer PEO-PPO-PEO (P123 or F127) and triblock copolymer PPO-PEO-PPO, which act as surfactants, may also be used.

The surfactant solution may be prepared by dissolving the surfactant in a solvent, such as water or alcohol, but is not limited thereto.

The molar ratio of the tungsten precursor to the surfactant may be from about 1:0.5 to about 1:3. When the amount of the surfactant is less than the above molar ratio, the pore volume of the formed tungsten carbide/carbon composite is too small, and when the amount of the surfactant is greater than the above molar ratio, the large amount of amorphous carbon from surfactant may be formed.

The tungsten precursor, the monomer, the solvent, and the surfactant solution may be mixed all at once, but alternatively, the solid tungsten precursor may be dissolved or dispersed in the solvent first, and then the resulting solution or dispersion may be mixed with the liquid monomer and surfactant solution for uniform mixing.

(b) Hydrothermal Synthesis

The mixture is generally hydrothermally synthesized at a temperature in a range from about 100° C. to about 300° C., for example, from about 150° C. to about 250° C. When the temperature is below 100° C., a reaction may not occur since the temperature is lower than the boiling point of water. When the temperature is above 300° C., the particle size of the tungsten-polymer composite may be too large. The reaction time of the hydrothermal synthesis may be in a range from about 10 to about 48 hours. When the reaction time is below 10 hours, the tungsten-polymer composite may not be sufficiently obtained, and when the reaction time is above 48 hours, the particle size of the tungsten-polymer composite may be too large and the pore structure may break down.

While hydrothermally synthesizing the mixture, the monomer is polymerized. To facilitate the polymerization reaction of the monomer, a polymerization initiator may be additionally added while hydrothermally synthesizing the mixture. Examples of the polymerization initiator include sodium persulfate, potassium persulfate, and iron chloride, but are not limited thereto. Here, the polymer generated by polymerizing the monomer forms a gel phase in the solvent, and sinks as a precipitate due to the heavy specific gravity as the tungsten precursor is added to the polymer.

(c) Calcination

The precipitate is separated through filtering or the like, and then the separated precipitate is calcined under an inert atmosphere so as to form the tungsten carbide/carbon composite.

The precipitate may be separated by using a filtering method using a filter or a centrifugal separating method. Also, nitrogen gas, argon gas, or the like, may be used to form the inert atmosphere. The calcination may be performed in a heating device having a heating space, such as an oven or a heating furnace. The calcination temperature generally is in a range from about 500 to about 1500° C., for example, from about 800 to about 1,200° C. When the calcination temperature is below 500° C., the tungsten carbide/carbon composite may not be formed, and when the calcination temperature is above 1500° C., the specific surface area of the tungsten carbide/carbon composite may be decreased due to a sintering phenomenon.

As the polymer is carbonized, the polymer combines with the tungsten precursor. At this point, those portions occupied by the polymer that do not combine with the tungsten precursor and the surfactant form spaces during the calcination, and thus a tungsten carbide/carbon composite support having minute pores is obtained.

(2) Preparation of Tungsten Carbide

The tungsten carbide/carbon composite prepared as described above is heat treated in the presence of ammonia gas or urea gas so as to remove amorphous carbon from the tungsten carbide/carbon composite, thereby preparing the tungsten carbide used in a catalyst according to an embodiment of the present invention. An atmospheric gas used in the heat treatment process for removing amorphous carbon deposited on a surface of the tungsten carbide/carbon composite may be ammonia gas or urea gas. These gases may be used to remove amorphous carbon without any damage to the lattice structure of the tungsten carbide. It is assumed that these gases react with the amorphous carbon and remove the amorphous carbon mainly in the form of methane gas. Hydrogen gas may also be used as the atmospheric gas to remove the amorphous carbon. In this case, however, the lattice structure of the tungsten carbide may be damaged. The heat treatment temperature may be in the range of about 500 to about 1,500° C., for example about 800 to about 1,200° C. or about 850 to about 950° C. The heat treatment time may not be limited. However, if the heat treatment temperature is high, the heat treatment time for the removal of the amorphous carbon may be reduced. On the other hand, if the heat treatment temperature is low, the heat treatment time may be increased. For example, when the heat treatment process is performed under the same conditions for 4 hours, the specific surface area of the obtained tungsten carbide is about 19 $m^2/g$; and when the heat treatment process is performed under the same conditions for 8 hours, the specific surface area of the obtained tungsten carbide is about 18 $m^2/g$.

(3) Preparation of Supported Catalyst (Supporting of Metal Catalyst Component)

Subsequently, a process of preparing an electrode catalyst by loading a metal catalyst component on a surface of the tungsten carbide is performed.

The tungsten carbide is uniformly dispersed in a first mixed solvent containing a polyol and at least one polar solvent selected from the group consisting of water, a C1-C4 aliphatic alcohol, and a C1-C4 aliphatic ketone, and combinations thereof, so as to prepare a tungsten carbide support dispersion. The weight ratio of the tungsten carbide support to the first mixed solvent is not specifically limited, and the weight of the first mixed solvent may be from about 10 to about 200 parts by weight based on 1 part by weight of the tungsten carbide support. The polyol is an alcohol compound including at least two hydroxyl groups. The polyol stabilizes a catalyst precursor compound, prevents particles of the catalyst precursor compound from aggregating, and reduces the catalyst precursor compound. The mixture ratio of the polyol to the at least one polar solvent in the first mixed solvent is not specifically limited, and may be about 10 to about 100 parts by weight of the at least one polar solvent based on 100 parts by weight of the polyol. When the mixture ratio of the polyol to the at least one polar solvent in the first mixed solvent is below 10 parts by weight, large particles may be generated as the particles aggregate during reduction. When the mixture ratio of the polyol to the at least one polar solvent in the first mixed solvent is above 100 parts by weight, large particles may be generated due to a rapid reduction reaction.

Separately from the above, a metal catalyst component precursor solution is prepared by adding and dissolving a metal catalyst component precursor in water or the second mixed solvent containing water and at least one polar solvent selected from the group consisting of C1-C4 aliphatic alcohol, C1-C4 aliphatic ketone, polyol, and combinations thereof. Examples of the aliphatic alcohol that may be included in the second mixed solvent include methanol, ethanol, iso-propanol, isomers of butanol and isomers of pentanol. Examples of the aliphatic ketone that may be included in the second mixed solvent include acetone and methyl ethyl ketone. The weight ratio of the water single solvent or the second mixed solvent to the metal catalyst component precursor is not specifically limited, but the amount used of the metal catalyst component precursor may be from about 0.3 to about 15 parts by weight based on 100 parts by weight of the water single solvent or the second mixed solvent. The mixture ratio of the water and the at least one polar solvent in the second mixed solvent may be from about 10 to about 30 parts by weight of the at least one polar solvent based on 100 parts by weight of water.

The metal catalyst component precursor may include: i) a palladium (Pd) precursor; and ii) at least one or two metal catalyst component precursors selected from the group consisting of a nickel (Ni) precursor, an iridium (Ir) precursor, a ruthenium (Ru) precursor, a cobalt (Co) precursor, a manganese (Mn) precursor, a gold (Au) precursor, an iron (Fe) precursor, and a silver (Ag) precursor. For example, the metal catalyst component precursor may include: i) a palladium (Pd) precursor; and ii) at least one or two metal catalyst component precursors selected from the group consisting of a nickel (Ni) precursor and an iridium (Ir) precursor. For example, the metal catalyst component precursor may be a palladium precursor-nickel precursor, a palladium precursor-iridium precursor, or a palladium precursor-iridium precursor-nickel precursor.

Palladium may be effectively supported on the tungsten carbide, but other metals such as nickel or iridium may not be effectively supported on the tungsten carbide support compared to the palladium. For example, when the amount of palladium precursor that makes the nominal loading amount of palladium with respect to the total weight of the final catalyst to be 20 wt % is used, the amount of other metals remaining in the final catalyst may be relatively small even when a large amount of precursor of the other metals such as a nickel precursor or an iridium precursor is used so that the atomic ratio of the palladium to the other metals is from about 3:3 to about 3:1. A relatively large amount of gold, iron, or silver may be supported compared to nickel or iridium. Even though the amount of nickel, iridium, gold, iron, or silver remaining in the final catalyst may be small compared to the amount of palladium, the catalytic activity is high compared to the case when only palladium is supported. The ratio of the palladium precursor to the other metals such as the nickel precursor or the iridium precursor is adjusted in such a way that the atomic ratio of the palladium to the other metals is from about 3:3 to about 3:1. The atomic ratio of the palladium to the other metals may be 3:1.

Examples of the palladium precursor include palladium (II) chloride, palladium (II) acetylacetonate, palladium (II) cyanide, palladium (II) acetate, palladium (II) sulfate, and palladium (II) nitrate. The examples of the palladium precursor further include $PdCl_2$, $(CH_3COO)_2Pd$, $PdSO_4$, and $Pd(NO_3)_2 \cdot xH_2O$. However, aspects of the present invention are not limited thereto.

Examples of the nickel precursor include $NiCl_2 \cdot xH_2O$, $(CH_3COO)_2Ni \cdot xH_2O$, nickel (II) acetylacetonate, nickel (II) carbonate hydroxide, nickel (II) hydroxide, $Ni(NO_3)_2 \cdot xH_2O$, $NiSO_4 \cdot xH_2O$, $NiI_2$, $NiF_2$. However, aspects of the present invention are not limited thereto.

Examples of the iridium precursor include $IrCl_3$, $IrCl_3 \cdot xH_2O$, $IrCl_4$, $IrBr_3$, $IrBr_4$, $IrI_4$, ammonium hexachloroiridate (III), ammonium hexachloroiridate (IV), potassium hexachloroiridate (III), potassium hexachloroiridate (IV), sodium hexachloroiridate (III), and sodium hexachloroiridate (IV). However, aspects of the present invention are not limited thereto.

Examples of the iron precursor include $(CH_3COO)_2Fe$, iron (III) acetylacetonate, iron (III) citrate, $FeCl_2 \cdot 4H_2O$, $FeCl_2$, $FeCl_3 \cdot 6H_2O$, $Fe(NO_3)_2$, $FeC_2O_2$, $FeSO_4$, $FeI_2$, and $FeF_2$. However, aspects of the present invention are not limited thereto.

Examples of the silver precursor include $CH_3COOAg$, silver acetylacetonate, $Ag_2CO_3$, and $AgNO_3$. However, aspects of the present invention are not limited thereto.

Then, the metal catalyst component precursor solution is mixed with the tungsten carbide dispersion so as to prepare a mixture, and the mixture is hydrothermally synthesized by refluxing the mixture at a pressure from about 1 to about 5 atm and at a temperature from about 120 to about 180° C. for from about 1 to about 3 hours. By doing so, the catalyst component including palladium (Pd) and at least one or two metal catalyst component selected from the group consisting of nickel (Ni), iridium (Ir), ruthenium (Ru), cobalt (Co), manganese (Mn), gold (Au), iron (Fe), and silver (Ag) is supported by the tungsten carbide.

Next, the reaction product thereof is filtered, washed, and dried, thereby obtaining a catalyst in which the combination of palladium and other metals such as nickel, iridium, gold, or the like is supported on the tungsten carbide support.

Hereinafter, a tungsten carbide according to an embodiment of the present invention and an electrode catalyst for a fuel cell according to an embodiment of the present invention will be described in detail for illustrative purposes only.

Synthesis Example 1

Tungsten Carbide/Carbon Composite 27 ml of a cetyl trimethyl ammonium bromide (CTABr) 25% aqueous solution was prepared as a surfactant. A mixture of 1.2 g of resorcinol and 1.8 ml of 30% formaldehyde was added to a first dispersion in which 5 g of ammonium metatungstate (manufactured by Aldrich) were dispersed in 20 ml of water, and the resultant mixture was stirred to obtain a uniform second dispersion.

The CTABr 25% aqueous solution and the second dispersion were put into a stainless-steel high-pressure reactor having a volume of 250 ml and were hydrothermally processed for 2 days at a pressure of 5 atm and at a temperature of 150° C. After the reaction, a tungsten precursor-polymer composite in a gel phase precipitated at the bottom of the high-pressure reactor.

The tungsten precursor-polymer composite was filtered, washed, and then dried for one day at a temperature of 110° C. so as to obtain about 11 g of dried tungsten precursor-polymer composite. The dried tungsten precursor-polymer composite was calcined for 1 hour at a temperature of 900° C. under an argon gas atmosphere, and then further calcined for 2 hours at a temperature of 900° C. under a hydrogen gas atmosphere so as to obtain about 4.5 g of a tungsten carbide/carbon composite support.

Upon analyzing the tungsten carbide/carbon composite at an acceleration voltage of 200 kV by using a X-ray diffractometer (CM-200 manufactured by Philips), and a transmission electron microscope (JEM 2010F manufactured by JEOL), it was found that, in the tungsten carbide/carbon composite, the tungsten carbide nano-particles formed an island-like phase, and the carbon formed a sea-like phase surrounding the island phase.

The specific surface area of the tungsten carbide/carbon composite was measured using a BET adsorption equation in a nitrogen gas adsorption test. The measured specific surface area of the tungsten carbide/carbon composite was about 64 $m^2/g$ and the average particle diameter of the tungsten carbide/carbon composite was about 0.02 μm.

Adsorption-isotherm analysis (Micromeritics Inc., model: ASAP 2010) and pore size analysis were performed on the tungsten carbide/carbon composite. As a result, it was found that the tungsten carbide/carbon composite had a IV-type adsorption isothermal curve, had an average pore diameter of about 2 to about 5 nm, and had an average pore volume of about 0.24 cm$^3$/g.

Synthesis Example 2

Preparation of Tungsten Carbide 2 g of the tungsten carbide/carbon composite prepared according to Synthesis Example 1 were loaded into a high-pressure stainless reactor with a volume of 250 ml and heat treated for 8 hours while ammonia gas was supplied thereto at a flow rate of 100 ml/min at about 1 to about 2 atm and at a temperature of 900° C., thereby obtaining tungsten carbide from which most amorphous carbon is removed.

The specific surface area of the obtained tungsten carbide measured using a BET equation in a nitrogen gas adsorption test was about 18 m$^2$/g, and the average diameter thereof was from about 0.3 to about 0.4 μm.

Adsorption-isotherm analysis (Micromeritics Inc., model: ASAP 2010) and pore size analysis were performed on the tungsten carbide. As a result, it was found that the tungsten carbide had the IV-type adsorption isothermal curve, had an average pore diameter of about 3 to about 5 nm, and had an average pore volume of about 0.085 cm$^3$/g.

FIG. 1 shows X-ray diffraction [acceleration voltage of 40 keV, Ni-filtered Cu Ka radiation] results of a tungsten carbide/carbon composite prepared according to Synthesis Example 1 and a tungsten carbide, from which amorphous carbon is removed, prepared according to Synthesis Example 2.

Referring to FIG. 1, the tungsten carbide/carbon composite (Synthesis Example 1), which was not subjected to the high-temperature ammonia treatment, and the tungsten carbide from which amorphous carbon was removed (Synthesis Example 2), which was subjected to the high-temperature ammonia treatment have substantially the same X-ray diffraction results. From this result, it can be seen that the high-temperature ammonia treatment does not damage the crystal lattice of the tungsten carbide.

A carbon-hydrogen-nitrogen (CHN) analysis was performed on the tungsten carbide/carbon composite (Synthesis Example 1). The entire carbon amount of the tungsten carbide/carbon composite was 9.74 wt %, which is higher than the theoretical carbon amount of the tungsten carbide (WC), that is, 6.12%. Such a result means that there is a great amount of the amorphous carbon that is not combined with tungsten. The CHN analysis was also performed on the tungsten carbide from which amorphous carbon was removed (Synthesis Example 2). The entire carbon amount of the tungsten carbide was 6.16 wt %, which is slightly higher than 6.12% that is the theoretical carbon amount of the tungsten carbide (WC) by as little as 0.04% (that is, the amount of the amorphous carbon was 0.04%). Such a result means that the amorphous carbon can be substantially completely removed by the high-temperature ammonia treatment. In consideration of the CHN analysis results and the X-ray diffraction results of FIG. 1, it can be seen that the high-temperature ammonia treatment may be used to selectively remove only the amorphous carbon, not carbon in the tungsten carbide crystal lattice.

The effective removal of the amorphous carbon deposited on the tungsten carbide/carbon composite by the high-temperature ammonia heat treatment can be identified by observing scanning electron microscope (SEM) and transmission electron microscope (TEM) images of the tungsten carbide/carbon composite (Synthesis Example 1) and the tungsten carbide from which amorphous carbon is removed (Synthesis Example 2). Through the SEM and TEM observations, the carbon decrease shown in the CHN analysis results is confirmed.

Synthesis Example 3

Preparation of Tungsten Carbide 2 g of the tungsten carbide/carbon composite prepared according to Synthesis Example 1 were loaded into a high-pressure stainless reactor with a volume of 250 ml and heat treated for 4 hours while ammonia gas was supplied thereto at a flow rate of 100 ml/min at about 1 to about 2 atm and at a temperature of 900° C., thereby obtaining tungsten carbide from which most amorphous carbon is removed.

The specific surface area of the obtained tungsten carbide measured using a BET equation in a nitrogen gas adsorption test was about 19 m$^2$/g.

Example 1

A catalyst was prepared by supporting palladium and nickel as catalyst components on the tungsten carbide obtained in Synthesis Example 2. The amount of the palladium precursor used was adjusted so that the nominal loading amount of the palladium was 20 wt % based on the total weight of the catalyst. Also, the amount of the nickel precursor used was adjusted so that the atomic ratio (used amount) of palladium to nickel was 3:1 in the reaction mixture. In Tables 1 to 3, the catalyst prepared in Example 1 is indicated as 20 wt % Pd$_3$Ni$_1$/WC. In this case, "20 wt %" indicates the nominal loading amount of the palladium based on the total weight of the catalyst. "Pd$_3$Ni$_1$" indicates that the palladium precursor and the nickel precursor are used in such a way that the atomic ratio of palladium to nickel in the mixture is 3:1. "WC" indicates the tungsten carbide of Synthesis Example 2 from which amorphous carbon is removed. Such an indicating method is identically applied to other catalysts in Tables 1 to 3.

0.6 g of the tungsten carbide of Synthesis Example 2, 101 ml of ethylene glycol, and 34 ml of distilled water were put into a 0.5 L round-bottomed flask purged with nitrogen gas and were stirred so as to be uniformly mixed. Then, a catalyst component precursor aqueous solution obtained by uniformly mixing 64 ml of distilled water, 0.25 g of PdCl$_2$, and 0.112 g of NiCl$_2$.6H$_2$O were added to the round-bottomed flask. The resultant thereof was stirred for 30 minutes at a temperature of 25° C. and at a pressure of 1 atm. Next, the temperature of the round-bottomed flask was increased to 140° C., and then the resultant was refluxed for 2 hours.

After the refluxing, the reaction product was filtered, washed, and dried at room temperature so as to obtain about 0.66 g of Pd$_3$Ni$_1$/WC catalyst. In the Pd$_3$Ni$_1$/WC catalyst, the relative weights of the components were measured by inductivity coupled plasma (ICP) optical emission spectroscopy. The weight ratio of palladium to nickel was 99.95:0.05 and the supported amount of palladium was about 19.12 wt % based on the total amount of the Pd$_3$Ni$_1$/WC catalyst.

Example 2

A Pd$_3$Ir$_1$/WC catalyst in which the nominal loading of palladium is 20 wt % was prepared using the tungsten carbide of Synthesis Example 2. The amount of the palladium precursor used was adjusted so that the nominal loading amount of the palladium was 20 wt % based on the total weight of the catalyst. Also, the amount of the iridium precursor used was adjusted so that the atomic ratio (used amount) of palladium to iridium was 3:1 in the reaction mixture.

About 0.68 g of $Pd_3Ir_1$/WC catalyst were obtained in the same manner as in Example 1, except that 0.25 g of $PdCl_2$ and 0.056 g of $IrCl_3.3H_2O$ were used while preparing the catalyst component precursor aqueous solution.

In the $Pd_3Ir_1$/WC catalyst, the relative weights of the components were measured by ICP optical emission spectroscopy. The weight ratio of palladium to iridium was 66.53:33.47 and the supported amount of palladium was 18.9 wt % based on the total weight of the $Pd_3Ir_1$/WC catalyst.

According to TEM results, the average particle size of the $Pd_3Ir_1$/WC catalyst was about 2.6 nm and the catalyst components were uniformly supported on the WC support.

Example 3

A $Pd_3Ir_1Ni_1$/WC catalyst in which the nominal loading of palladium is 20 wt % was prepared using the tungsten carbide of Synthesis Example 2. The amount of the palladium precursor used was adjusted so that the nominal loading amount of the palladium was 20 wt % based on the total weight of the catalyst. Also, the amounts of the nickel precursor and the iridium precursor used were adjusted so that the atomic ratio (used amount) of palladium to iridium to nickel was 3:1:1 in the reaction mixture.

About 0.68 g of $Pd_3Ir_1Ni_1$/WC catalyst were obtained in the same manner as in Example 1, except that 0.25 g of $PdCl_2$, 0.056 g of $IrC_3.3H_2O$, and 0.112 g of $NiCl_2.6H_2O$ were used while preparing the catalyst component precursor aqueous solution.

In the $Pd_3Ir_1Ni_1$/WC catalyst, the weight ratio of palladium to iridium to nickel was 66.84:33.11:0.05 and the supported amount of palladium was 18.8 wt % based on the total weight of the $Pd_3Ni_2$/WC catalyst. These were measured by ICP optical emission spectroscopy.

According to TEM results, the average particle size of the $Pd_3Ir_1Ni_1$/WC catalyst was about 2.8 nm and the catalyst components were uniformly supported on the WC support.

Comparative Example 1

A $Pd_3Ni_1$/WC/C catalyst in which the nominal loading of palladium is 20 wt % was prepared using the tungsten carbide/carbon (WC/C) composite prepared according to Synthesis Example 1. The amount of the palladium precursor was adjusted so that the nominal loading amount of the palladium was to be 20 wt % based on the total weight of the catalyst. Also, the amount of the nickel precursor used was adjusted so that the atomic ratio (used amount) of palladium to nickel was 3:1 in the reaction mixture. "WC/C" indicates the tungsten carbide/carbon composite prepared according to Synthesis Example 1.

0.6 g of the tungsten carbide/carbon composite prepared according to Synthesis Example 1, 101 ml of ethylene glycol, and 34 ml of distilled water were put into a 0.5 L round-bottomed flask purged with nitrogen gas and were stirred so as to be uniformly mixed. Then, a catalyst component precursor aqueous solution obtained by uniformly mixing 64 ml of distilled water, 0.25 g of $PdCl_2$, and 0.112 g of $NiCl_2.6H_2O$ was added to the round-bottomed flask. The resultant thereof was stirred for 30 minutes at a temperature of 25° C. and at a pressure of 1 atm. Next, the temperature of the round-bottomed flask was increased to 140° C., and then the resultant was refluxed for 2 hours.

After the reflux, the reaction product was filtered, washed, and dried at room temperature so as to obtain about 0.66 g of $Pd_3Ni_1$/WC/C catalyst. In the $Pd_3Ni_1$/WC/C catalyst, the weight ratio of palladium to nickel was 99.95:0.05 and the supported amount of palladium was about 19.12 wt % based on the total amount of the $Pd_3Ni_1$/WC/C catalyst. These were measured by ICP optical emission spectroscopy.

Comparative Example 2

A $Pd_3Ni_1$/C catalyst in which the nominal loading of palladium is 20 wt % was prepared using a carbon support. The amount used of the palladium precursor was adjusted so that the nominal loading amount of the palladium was 20 wt % based on the total weight of the catalyst. Also, the amount of the nickel precursor used was adjusted so that an atomic ratio (used amount) of palladium to nickel was 3:1 in the reaction mixture.

0.6 g of carbon black (Cabot Corporation, Vulcan XC-72), 101 ml of ethylene glycol, and 34 ml of distilled water were put into a 0.5 L round-bottomed flask purged with nitrogen gas and were stirred so as to be uniformly mixed. Then, a catalyst component precursor aqueous solution obtained by uniformly mixing 64 ml of distilled water, 0.25 g of $PdCl_2$, and 0.112 g of $NiCl_2.6H_2O$ was added to the round-bottomed flask. The resultant thereof was stirred for 30 minutes at a temperature of 25° C. and at a pressure of 1 atm. Next, the temperature of the round-bottomed flask was increased to 140° C., and then the resultant was refluxed for 2 hours.

After the reflux, the reaction product was filtered, washed, and dried at room temperature so as to obtain about 0.64 g of $Pd_3Ni_1$/C catalyst. In the $Pd_3Ni_1$/C catalyst, the weight ratio of palladium to nickel was 99.9:0.1 and the supported amount of palladium was about 17.66 wt % based on the total amount of the $Pd_3Ni_1$/C catalyst. These were measured by ICP optical emission spectroscopy.

Reference Example

A commercially available Pt/C catalyst in which the nominal loading of platinum supported on carbon black is 20 wt % based on the total weight of the Pt/C catalyst, which is manufactured by Johnson & Matthey Inc., was used.

Comparative Example 3

In the present experiment, 20 wt % Pt/C catalyst, which was used in the Reference Example, was directly synthesized. The amount of the platinum precursor used was adjusted so that the nominal loading amount of the platinum was 20 wt % based on the total weight of the catalyst.

0.6 g of carbon black (Cabot Corporation, Vulcan XC-72), 101 ml of ethylene glycol, and 34 ml of distilled water were put into a 0.5 L round-bottomed flask purged with nitrogen gas and were stirred so as to be uniformly mixed. Then, a catalyst component precursor aqueous solution obtained by uniformly mixing 64 ml of distilled water, and 1.49 g of $H_2PtCl_6$ was added to the round-bottomed flask. The resultant thereof was stirred for 30 minutes at a temperature of 25° C. and at a pressure of 1 atm. Next, the temperature of the round-bottomed flask was increased to 140° C., and then the resultant was refluxed for 2 hours.

After the refluxing, the reaction product was filtered, washed, and dried at room temperature so as to obtain about 0.64 g of Pt/C catalyst. In the Pt/C catalyst, the supported amount of Pt was about 18.9 wt % based on the total amount of the Pt/C catalyst.

Half Cell Test

Electrodes were prepared as follows by using the catalysts prepared according to the Examples and the Comparative Examples.

First, 20 mg of each of the catalysts, 1 ml of distilled water, and 10 μl of NAFION® (Dupont Co.) 10 wt % solution (prepared by Aldrich) were mixed so as to prepare a mixture. Then, the mixture was homogenized for 30 minutes by using ultrasonication so as to obtain a dispersion. A glassy carbon electrode (MF-2012 manufactured by BASi) was coated with 5 μl of the obtained dispersion and then dried, and was again coated with 5 μl of NAFION® solution as a fixture, and then dried.

In order to compare the hydrogen oxidation activity of each of the catalysts prepared according to the Examples and the Comparative Examples, a half cell test was performed on the electrodes prepared as above.

Each of the electrodes was used as a working electrode, Ag/AgCl (3M NaCl) was used as a reference electrode, and a platinum line was used as a counter electrode. 1 M sulfuric acid solution was used as an electrolyte, and, in order to remove gas dissolved in the electrolyte, nitrogen was supplied to the electrolyte for 30 minutes before the half cell test. Then, the performance of each working electrode was measured at a sweep speed of 50 mV/sec using a potentiostat/galvanostat (EG&G Princeton Applied Research, M273) while performing hydrogen oxidation at room temperature on each electrode.

The characteristics of the cyclic voltammograms of each working electrode were analyzed in a range of about −0.2 V to about 0.9 V (vs. Ag/AgCl). The characteristics were analyzed through a voltage-current curve of the last cycle that reached a steady state, by cycling each electrode 20 times. The results of half cell tests were also compared with the activity of a working electrode prepared by using the commercial Pt/C catalyst of the Reference Example.

Figure 2:
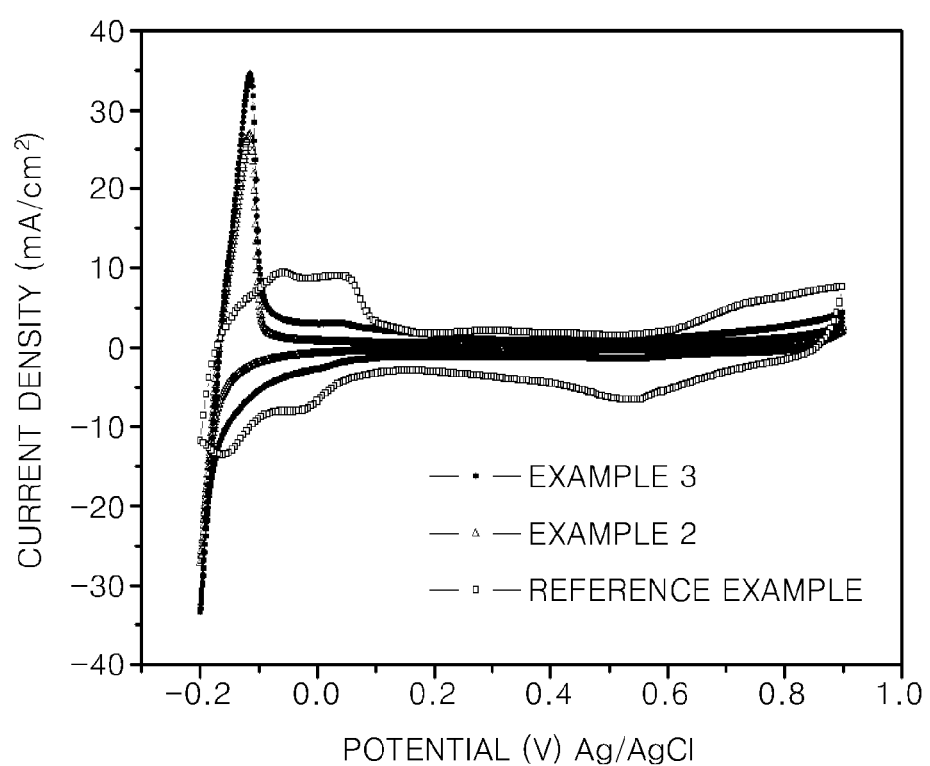
FIG. 2 is a cyclic voltammogram (CV) showing half cell test results of electrodes manufactured using catalysts prepared according to Examples 2 and 3 and the Reference Example.

FIG. 2 is a cyclic voltammogram showing the half cell test results of the electrodes manufactured using the catalysts prepared according to Examples 2 and 3 and the Reference Example.

Referring to FIG. 2, the 20 wt % $Pd_3Ir_1$/WC catalyst (Example 2) prepared using the tungsten carbide and the 20 wt % $Pd_3Ir_1Ni_1$/WC catalyst (Example 3) prepared using the tungsten carbide show very different voltage-current curve behaviors compared to that of commercially available 20 wt % Pt/C catalyst (HiSPEC® 3000, Johnson Matthey) of the Reference Example. The commercially available 20 wt % Pt/C catalyst (HiSPEC® 3000) of the Reference Example shows hydrogen adsorption and desorption characteristics in a wide voltage range. The catalyst of Example 2 has a smaller peak area compared to the catalyst of the Reference Example but has a large oxidation current peak in a low voltage range (−0.116 V) in which hydrogen oxidation activity is relatively high. The catalyst of Example 3 has a larger peak area than the catalyst of the Reference Example and has a large oxidation current peak in a low voltage range (−0.115 V) in which hydrogen oxidation activity is relatively high.

Table 1 shows half cell test results of the electrodes manufactured using the catalysts prepared according to Examples 1-3, Comparative Example 3 and the Reference Example.

TABLE 1

| Anode catalyst | | Area of hydrogen adsorption and desorption region (mV · A) | Percentage of area of hydrogen adsorption and desorption region with respect to Reference Example |
|---|---|---|---|
| Example 1 | 20 wt % $Pd_3Ni_1$/WC | $6.69 \times 10^{-2}$ | 63 |
| Example 2 | 20 wt % $Pd_3Ir_1$/WC | $9.05 \times 10^{-2}$ | 85 |
| Example 3 | 20 wt % $Pd_3Ir_1Ni_1$/WC | $1.28 \times 10^{-1}$ | 121 |
| Reference Example | 20 wt % Pt/C (HiSPEC ® 3000) | $1.06 \times 10^{-1}$ | 100 |
| Comparative Example 3 | 20 wt % Pt/C (Directly synthesized) | $9.11 \times 10^{-2}$ | 86 |

Referring to Table 1, the commercially available 20 wt % Pt/C catalyst (HiSPEC® 3000) of the Reference Example, which is currently widely used as an oxidation electrode catalyst of a polymer electrolyte membrane fuel cell, has a wide hydrogen adsorption and desorption region, which means good activity with respect to a hydrogen oxidation reaction. The activity of the catalyst of Example 2 is about 85% that of the commercially available 20 wt % Pt/C catalyst (HiSPEC® 3000) of the Reference Example in terms of the area of the hydrogen adsorption and desorption region. This means that although platinum was not used as a catalyst component, the hydrogen oxidation capability of the catalyst of Example 2 is 85% that of the commercially available 20 wt % Pt/C catalyst (HiSPEC® 3000) of the Reference Example in terms of the area of the hydrogen adsorption and desorption region.

The activity of the catalyst of Example 3 is about 121% that of the commercially available 20 wt % Pt/C catalyst (HiSPEC® 3000) of the Reference Example in terms of the area of the hydrogen adsorption and desorption region. This means that although platinum was not used as a catalyst component, the hydrogen oxidation capability of the catalyst of Example 3 is higher than that of the commercially available 20 wt % Pt/C catalyst (HiSPEC® 3000) of the Reference Example in terms of the area of the hydrogen adsorption and desorption region. The results indicate that there is a large electrical interaction between the tungsten carbide from which the amorphous carbon is substantially totally removed and the palladium-iridium-nickel catalyst component. Compared to the results of Example 2, the results of Example 3 may stem from an increase in the hydrogen adsorption and desorption region due to further addition of nickel.

The hydrogen oxidation capability of the 20 wt % Pt/C catalyst that was directly prepared using a polyol method according to Comparative Example 3 is 86% that of the commercially available 20 wt % Pt/C catalyst (HiSPEC® 3000) of the Reference Example in terms of the area of the hydrogen adsorption and desorption region, wherein the catalyst of Comparative Example 3 has the same loading amount of platinum as the commercially available catalyst of the Reference Example. This means that even when the same amounts of a platinum catalyst component and carbon are used, electrochemical activity and stability may differ according to the synthesis method.

Unit Cell Tests

Anodes were manufactured using the catalysts prepared according to Examples 1 through 3, Comparative Examples 1 through 3, and the Reference Example.

Each of the catalysts prepared according to Examples 1 through 3 and Comparative Examples 1 through 3, 1.2 ml of isopropyl alcohol, and 0.4 g of NAFION® solution were uniformly mixed to prepare a slurry for forming an anode catalyst layer, wherein the amount of the catalyst used was controlled such that the catalyst amount in the anode was 0.3 mgPd/cm$^2$ (Examples 1-3 and Comparative Examples 1 and 2), and 0.3 mgPt/cm$^2$ (the Reference Example and Comparative Example 3). The slurry was spray coated on carbon paper (manufacturer: Toray, model: TGPH-060) and dried overnight under atmospheric conditions and then dried in a vacuum oven at a temperature of 80° C. for 2 hours, thereby completing manufacturing of an anode.

A cathode was prepared in the same manner as the anode manufacturing method described above, except that the commercially available Pt/C catalyst (HiSPEC® 3000) of the Reference Example was used in such an amount that the catalyst amount in the cathode was 0.3 mgPt/cm$^2$. That is, 0.047 g of 20 wt % commercially available Pt/C catalyst, 1.2 ml of iso-propanol, and 0.4 g of NAFION® solution were uniformly mixed to prepare a slurry for forming a cathode catalyst layer. The slurry was spray coated on carbon paper (manufacturer: Toray, model: TGPH-060) and dried over night under atmospheric conditions and then dried in a vacuum oven at a temperature of 80° C. for 2 hours, thereby completing manufacturing of a cathode.

The prepared anode and cathode were respectively stacked on sides of a proton conductive polymer film (Dupont Co., NAFION® 212 film) and the resultant structure was hot pressed at a temperature of 125° C. and under a pressure of 1500 psia for two minutes so as to manufacture a membrane electrode assembly (MEA). A separation plate for a fuel supply and a separation plate for an oxidant supply were respectively attached to the anode and cathode, thereby manufacturing a unit cell.

Battery performances of unit cells including the catalysts prepared according to Examples 1 through 3 and Comparative Examples 1 through 3 were evaluated as follows.

Battery performances of the unit cells were evaluated using a battery test device (Won A Tech, Smart II) at a temperature of 60° C. Hydrogen gas was supplied through the separation plate at the anode at a flow rate of 150 ml/min and air was supplied through the separation plate at the cathode at a flow rate of 1 L/min. Changes in voltage and power density with respect to change in current density were measured to evaluate battery performances at a temperature of 60° C.

A long-term stability test of the unit cells was performed. After the battery performances of the unit cells were evaluated, the hydrogen flow rate was controlled to 50 ml/min and the air flow rate was controlled to 300 ml/min, and the unit cells were continuously operated at a constant voltage of 0.6 V for 50 hours. In this case, the operation temperature of the unit cells was fixed to 60° C. After the 50 hours of the continuous operation, the hydrogen flow rate was increased to 150 ml/min and the air flow rate was increased to 1 L/min and then power density of the unit cells was evaluated. The power densities before and after the 50 hours of the continuous operation were compared to evaluate the long-term stability of the unit cells.

Figure 3:
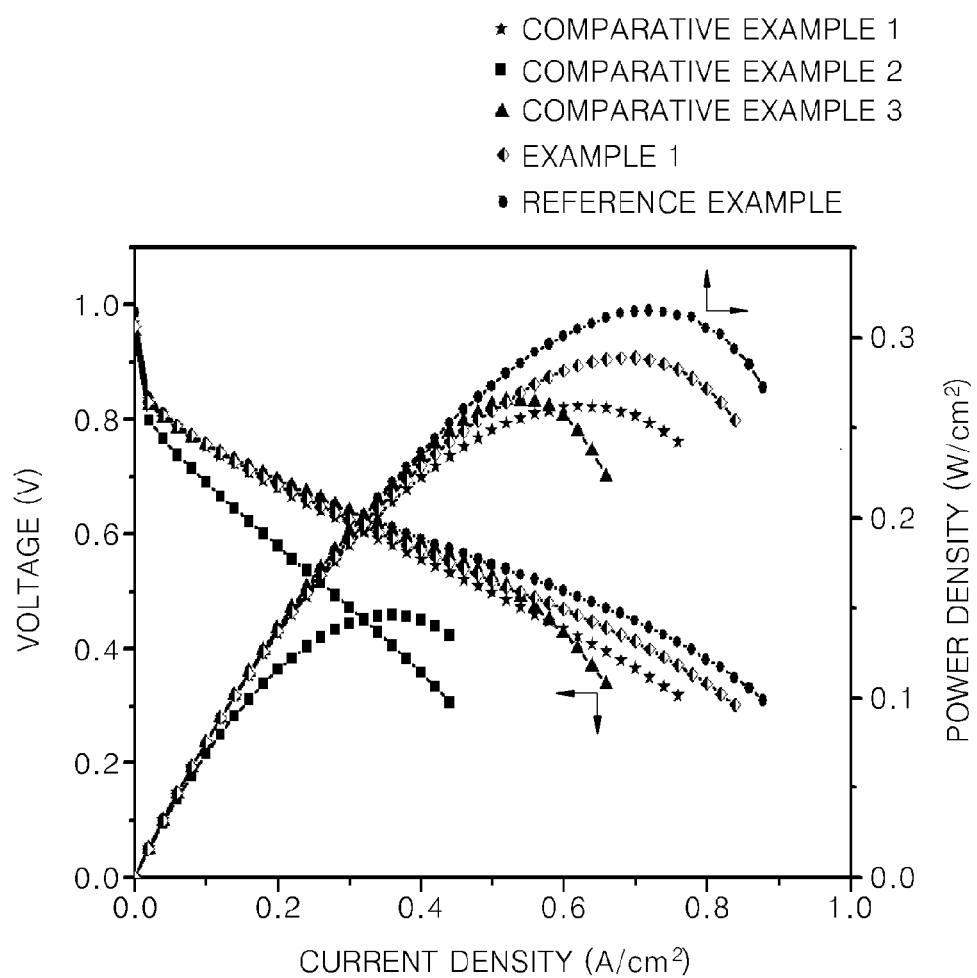
FIGS. 3 and 4 show performance test results of unit cells manufactured using the catalysts prepared according to Example 1, Comparative Examples 1 through 3, and the Reference Example.
Figure 4:
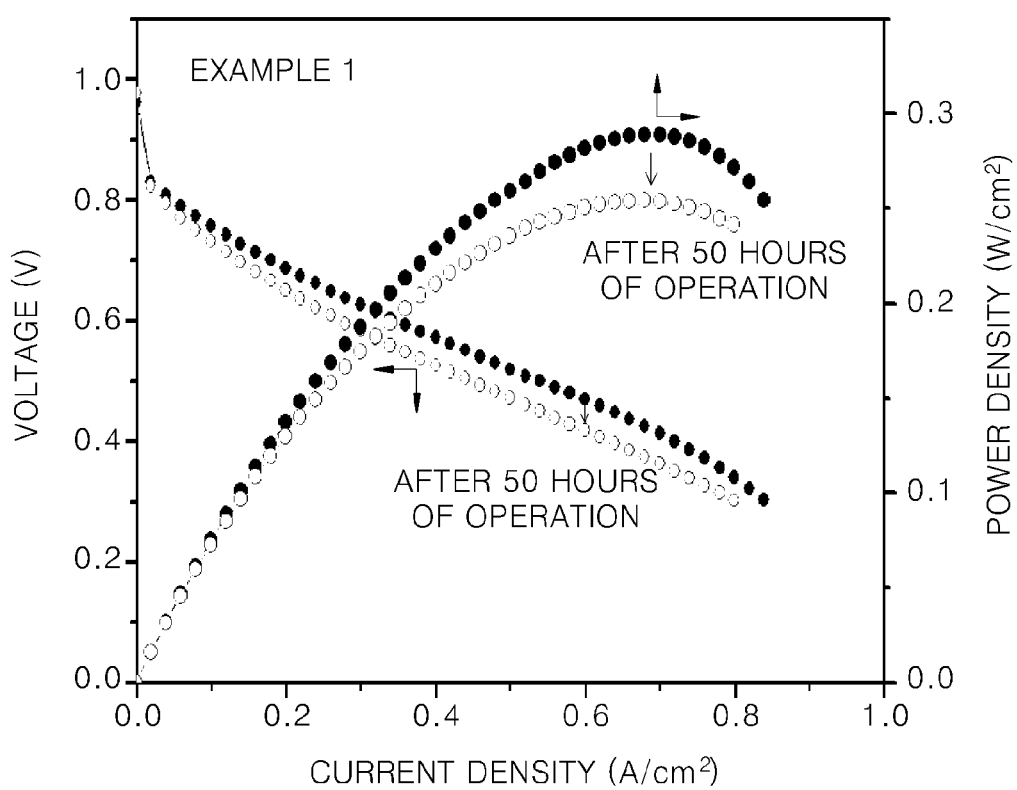

FIGS. 3 and 4 show performance test results of the unit cells manufactured using the catalysts prepared according to Example 1, Comparative Examples 1 through 3, and the Reference Example. FIG. 3 shows current-voltage (I-V) characteristics and current-power (I-P) characteristics induced therefrom so as to compare performance of the catalysts of Example 1, Comparative Examples 1-3, and the Reference Example. FIG. 4 shows long-term stability test results of the unit cell manufactured using the catalyst of Example 1.

Referring to FIG. 3, in regard to activity with respect to a hydrogen oxidation reaction, the activity of the unit cell using the Pd$_3$Ni$_1$/WC catalyst (Example 1) in which the nominal loading amount of Pd is 20 wt % was about 8% higher than the activity of the unit cell using the Pd$_3$Ni$_1$/WC/C catalyst (Comparative Example 1) in which the nominal loading amount of Pd is 20 wt %. This result may be due to the fact that the exposed portion of the tungsten carbide from which the amorphous carbon was removed may contact palladium-nickel, and a synergy occurred such that the activity was improved. When the catalyst of Comparative Example 1 was used, the synergy was limited due to the amorphous carbon covering the tungsten carbide. However, when the catalyst of Example 1 from which most amorphous carbon was removed was used, the synergy is maximized and the activity increased correspondingly.

Referring to the long-term stability test results of the unit cell manufactured using the catalyst of Example 1 shown in FIG. 4, it can be seen that the unit cell had good long-term stability due to a strong metal-tungsten carbide bond between the palladium-nickel catalyst component and the tungsten carbide (see Table 2). This was due to an increase in the exposed portion of the tungsten carbide capable of contacting the catalyst component.

Table 2 shows performance test results of the unit cells manufactured using the catalysts of Example 1, Comparative Examples 1-3, and the Reference Example, as shown in FIGS. 3 and 4.

TABLE 2

| | Anode catalyst | Maximum output power density (mWcm$^2$) | Percentage with respect to Comparative Example 2 (%) | Percentage with respect to Reference Example (%) | Output power density after 50 hours of operation (mW/cm$^2$) | Percentage of reduced output power density after 50 hours of operation with respect to the maximum output power density before 50 hours of operation |
|---|---|---|---|---|---|---|
| Example 1 | 20 wt % Pd$_3$Ni$_1$/WC | 290 | 196 | 92 | 254 | 13 |
| Comparative Example 1 | 20 wt % Pd$_3$Ni$_1$/WC/C | 263 | 178 | 84 | 221 | 16 |
| Comparative Example 2 | 20 wt % Pd$_3$Ni$_1$/C | 148 | 100 | 47 | 111 | 25 |
| Reference Example | 20 wt % Pt/C (HiSPEC ® 3000) | 314 | 212 | 100 | 283 | 10 |
| Comparative Example 3 | 20 wt % Pt/C (Directly synthesized) | 265 | 179 | 84 | 205 | 23 |

Referring to Table 2, when results of Example 1 are compared to results of the Reference Example, it can be seen that the maximum output power density of the $Pd_3Ni_1/WC$ catalyst of Example 1 in which the nominal loading amount of Pd was 20 wt % was 290 $mW/cm^2$, which was about 92% of that of the commercially available Pt/C catalyst (HiSPEC® 3000) of the Reference Example in which the nominal loading amount of Pt is 20 wt %. In addition, the catalyst of Example 1 showed comparable long-term stability compared to the catalyst of the Reference Example. Regarding long-term stability results of the unit cells after 50 hours of operation, the output power density of the unit cell of Example 1 was 254 $mW/cm^2$, which was about 13% less than before 50 hours of operation. When results of Example 1 are compared to results of Comparative Example 1, it can be seen that the activity with respect to a hydrogen oxidation reaction and the long-term stability were able to be substantially increased only by the removal of the amorphous carbon from the tungsten carbide/carbon composite. When results of Example 1 are compared to results of Comparative Example 2, it can be seen that when tungsten carbide from which most amorphous carbon was removed was used instead of carbon, the catalytic activity and the long-term stability were substantially increased, showing that a strong synergy occurred between the catalyst component and the tungsten carbide from which most amorphous carbon was removed compared to the activity between the catalyst component and carbon. Although the catalysts of Comparative Example 2 and Example 1 contained the same kind of and the same amount of metal catalyst component, the catalyst of Comparative Example 2 showed much lower activity with respect to the hydrogen oxidation reaction and long-term stability than Example 1. This means that the catalyst of Comparative Example 2 was poor in terms of usefulness. The catalyst of Example 1 showed higher activity with respect to the hydrogen oxidation reaction and long-term stability than the 20 wt % Pt/C catalyst of Comparative Example 3 directly prepared using the polyol method.

The commercially available Pt/C catalyst (HiSPEC® 3000) of the Reference Example, which is currently widely used in a polymer electrolyte fuel cell oxidation electrode catalyst, had the maximum output power density of 314 $mW/cm^2$, and after 50 hours of operation, the output power density was reduced by about 10%. That is, the catalyst of the Reference Example showed the highest activity and stability among the catalysts used in this experiment. However, such results were obtained based on the expensive platinum catalyst component.

The directly prepared Pt/C catalyst of Comparative Example 3 in which the nominal loading amount of Pt is 20 wt % had the maximum output power density of 265 $mW/cm^2$, which was about 84% of that of the commercially available Pt/C catalyst, and the output power density thereof after 50 hours of operation was relatively substantially reduced by 23%. Such results mean that even when same amounts of platinum and carbon are used, the activity and stability of the catalyst prepared may differ according to the synthesis method.

Figure 5:
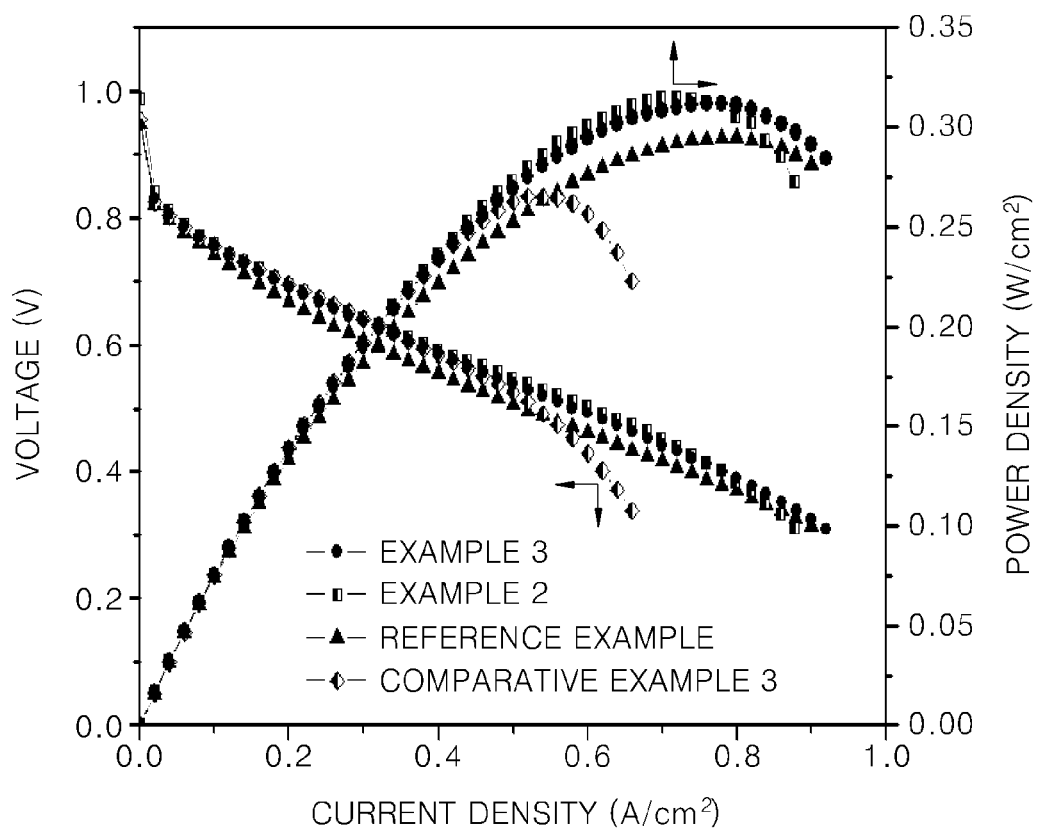
FIGS. 5 to 7 show performance test results of unit cells manufactured using the catalysts prepared according to Examples 2-3, Comparative Example 3, and the Reference Example.
Figure 6:
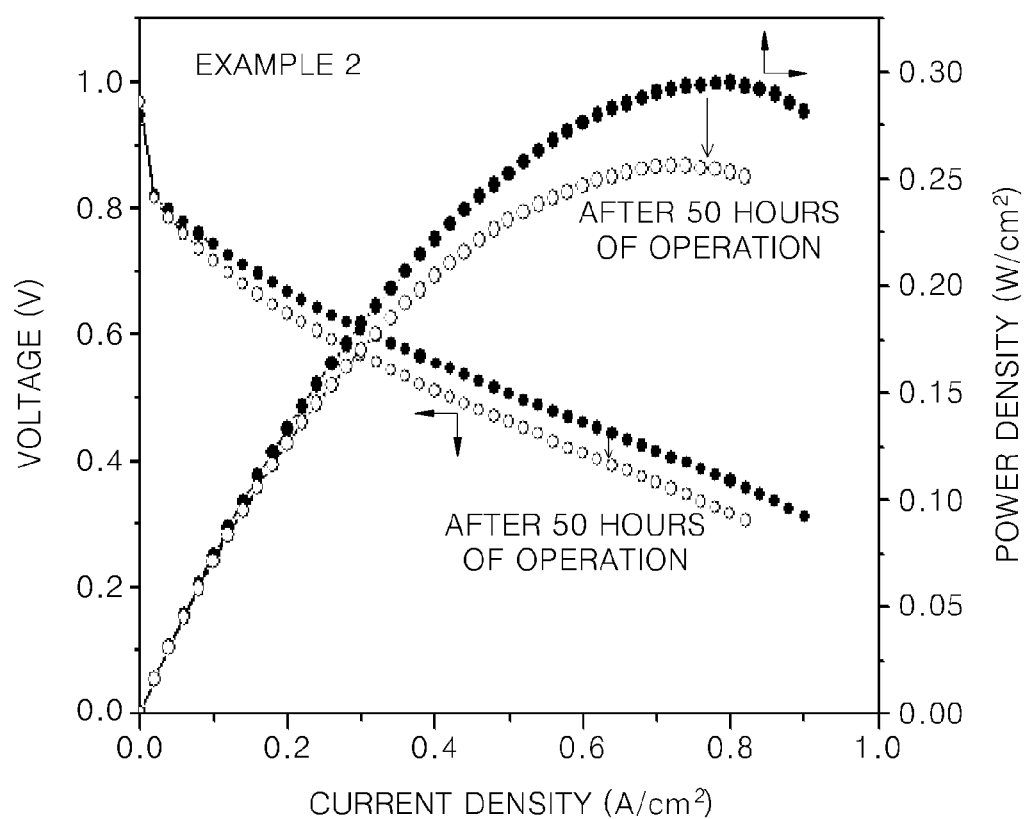
Figure 7:
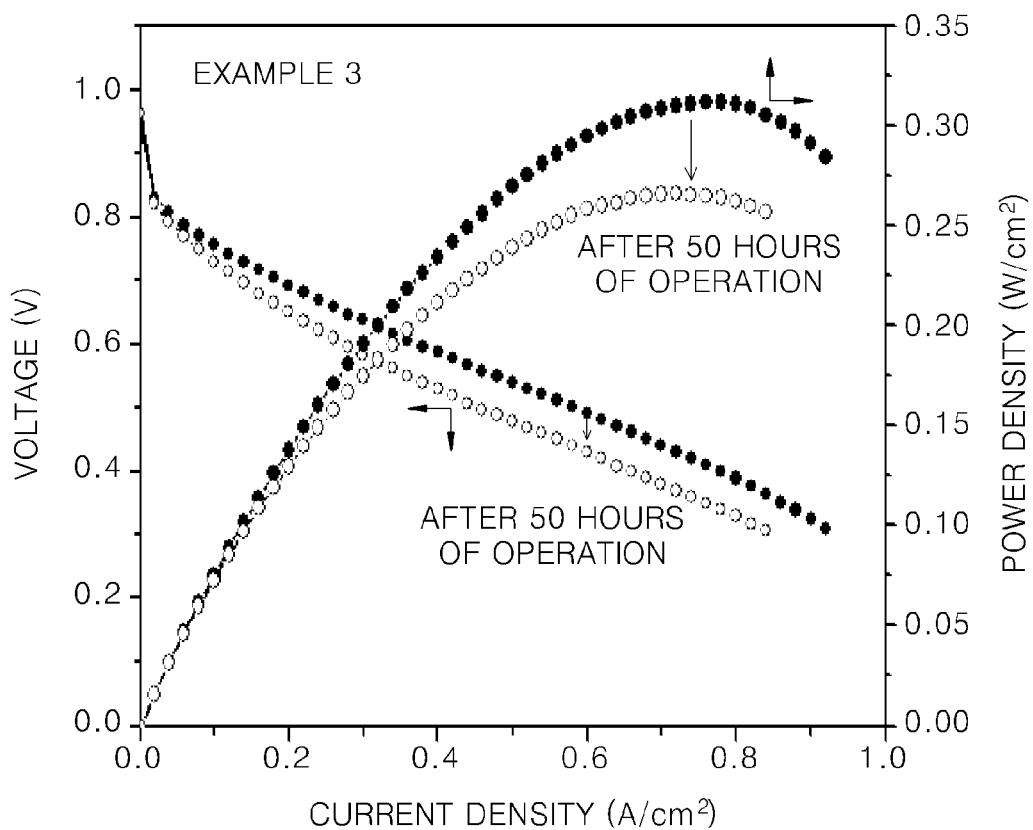

FIGS. 5 to 7 show performance test results of the unit cells manufactured using the catalyst of Examples 2-3, Comparative Example 3, and the Reference Example. FIG. 5 shows current-voltage (I-V) characteristics and current-power (I-P) characteristics induced therefrom so as to compare performance of the catalysts of Example 2-3, Comparative Example 3 and the Reference Example. FIG. 6 shows long-term stability test results of the unit cell manufactured using the catalyst of Example 2. FIG. 7 shows long-term stability test results of the unit cell manufactured using the catalyst of Example 3.

Referring to FIG. 5, the maximum output power density of the unit cell manufactured using the $Pd_3Ir_1/WC$ catalyst of Example 2 in which the nominal loading amount of Pd is 20 wt % was 295 $mW/cm^2$. The maximum output power density of the unit cell manufactured using the $Pd_3Ir_1Ni_1/WC$ catalyst of Example 3 in which the nominal loading amount of Pd is 20 wt % was 312 $mW/cm^2$. The maximum output power density of the unit cell manufactured using the commercially available Pt/C catalyst (HiSPEC® 3000) of the Reference Example, which is currently widely used in polymer electrolyte fuel cell oxidation electrode catalysts, was 314 $mW/cm^2$, which is the highest value among the catalysts used in this experiment. The maximum output power density of the unit cell manufactured using the directly prepared Pt/C catalyst of Comparative Example 3 in which the nominal loading amount of Pd is 20 wt % was 265 $mW/cm^2$.

Referring to the long-term stability test results of the unit cell manufactured using the catalyst of Example 2 shown in FIG. 6, the output power density after 50 hours of operation was 257 $mW/cm^2$, which was about 13% lower than the maximum output power density before 50 hours of operation. From these results, it can be seen that the unit cell had good long-term stability due to a strong metal-tungsten carbide bonding between palladium-iridium and tungsten carbide (see Table 3). This was due to an increase in the exposed portion of the tungsten carbide capable of contacting the palladium-iridium catalyst component.

Referring to long-term stability test results of the unit cell manufactured using the catalyst of Example 3 shown in FIG. 7, the output power density of the unit cell after 50 hours of operation was 267 $mW/cm^2$, which was only about 14% less than the maximum output power density before 50 hours of operation. From this result, it can be seen that the unit cell had good long-term stability due to a strong metal-tungsten carbide bond between the palladium-iridium-nickel and tungsten carbide (see Table 3). This was due to an increase in the exposed portion of the tungsten carbide capable of contacting the palladium-iridium-nickel catalyst component.

Table 3 below shows performance test results of the unit cells manufactured using the catalysts of Examples 1-3, Comparative Example 3, and the Reference Example shown in FIGS. 5-7.

TABLE 3

|  | Anode catalyst | Maximum output power density ($mW/cm^2$) | Percentage with respect to Reference Example (%) | Output power density after 50 hours of operation ($mW/cm^2$) | Percentage of reduced output power density after 50 hours of operation with respect to the maximum output power density before 50 hours of operation (%) |
|---|---|---|---|---|---|
| Example 3 | 20 wt % $Pd_3Ir_1Ni_1/WC$ | 312 | 99 | 267 | 14 |

TABLE 3-continued

| | Anode catalyst | Maximum output power density (mW/cm$^2$) | Percentage with respect to Reference Example (%) | Output power density after 50 hours of operation (mW/cm$^2$) | Percentage of reduced output power density after 50 hours of operation with respect to the maximum output power density before 50 hours of operation (%) |
|---|---|---|---|---|---|
| Example 2 | 20 wt % Pd$_3$Ir$_1$/WC | 295 | 94 | 257 | 13 |
| Example 1 | 20 wt % Pd$_3$Ni$_1$/WC | 290 | 92 | 254 | 13 |
| Reference Example | 20 wt % Pt/C (HiSPEC® 3000) | 314 | 100 | 283 | 10 |
| Comparative Example 3 | 20 wt % Pt/C (Directly synthesized) | 265 | 84 | 205 | 23 |

Referring to Table 3, the catalysts prepared according to Examples 1-3 had an activity with respect to a hydrogen oxidation reaction and stability similar to that of a platinum-based catalyst, and the activities of the catalysts of Examples 1-3 were high. Such results indicate that there was a high electrochemical synergy between a palladium-containing metal catalyst component and tungsten carbide from which amorphous carbon is removed.

As described above, according to one or more of the above embodiments of the present invention, an electrode catalyst for a fuel cell includes a porous tungsten carbide which has a controlled specific surface area and from which amorphous carbon not bound to tungsten (that is, amorphous carbon that is outside of a WC crystal lattice) is substantially removed; and a combination of: i) palladium (Pd) and ii) at least one or two metal catalyst components selected from the group consisting of nickel (Ni), iridium (Ir), ruthenium (Ru), cobalt (Co), manganese (Mn), gold (Au), iron (Fe), and silver (Ag). Due to a strong electrochemical synergy between palladium and the tungsten carbide and a synergy between two or more catalyst components including palladium, the electrode catalyst shows high hydrogen oxidation activity. Without using expensive platinum, the electrode catalyst is comparable to the commercially available Pt/C catalyst which is widely used as an anode catalyst for a fuel cell and even in some cases, shows higher hydrogen oxidation activity than the Pt/C catalyst. Accordingly, the electrode catalyst may be effectively used instead of the platinum electrode catalyst that accounts for most of the manufacturing costs for a polymer electrolyte membrane fuel cell, in terms of the overall considerations including electrochemical activity and cost competitiveness, and ultimately, this may contribute to commercialization of less expensive polymer electrolyte membrane fuel cells.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electrode catalyst comprising:
   tungsten carbide having a specific surface area of about 10 to about 30 m$^2$/g; and
   a metal catalyst comprising palladium (Pd) or palladium alloy; and two other metals, wherein the first other metal is selected from the group consisting of nickel (Ni), cobalt (Co), manganese (Mn), and iron (Fe), and the second other metal is selected from the group consisting of iridium (Ir), ruthenium (Ru) and gold (Au), the metal catalyst being devoid of platinum, and wherein the tungsten carbide comprises amorphous carbon; wherein, based on the total weight of the electrode catalyst, the amount of the tungsten carbide is in the range of about 60 to about 95 wt % and the amount of the metal catalyst is in the range of about 5 to about 40 wt %.

2. The electrode catalyst of claim 1, wherein the weight ratio of the palladium (Pd) to the first other metal to the second other metal is in the ratio range of about 66.7:33.2:0.1 to about 99.998:0.001:0.001.

3. The electrode catalyst of claim 1, wherein the metal catalyst comprises palladium (Pd) and at least one other metal selected from the group consisting of nickel (Ni) and iridium (Ir).

4. The electrode catalyst of claim 1, wherein the amorphous carbon is outside of the crystal lattice structure of the tungsten carbide.

5. An electrode comprising the electrode catalyst of claim 1.

6. A fuel cell comprising the electrode of claim 5.

7. The fuel cell of claim 6, wherein the electrode is an anode.

8. An electrode catalyst comprising:
   tungsten carbide; wherein the tungsten carbide comprises amorphous carbon; and
   a metal catalyst comprising palladium (Pd) or palladium alloy; and two other metals, wherein the first other metal is selected from the group consisting of nickel (Ni), cobalt (Co), manganese (Mn), and iron (Fe), and the second other metal is selected from the group consisting of iridium (Ir), ruthenium (Ru) and gold (Au), the metal catalyst being devoid of platinum; wherein, based on the total weight of the electrode catalyst, the amount of the tungsten carbide is in the range of about 60 to about 95 wt % and the amount of the metal catalyst is in the range of about 5 to about 40 wt %.

9. The electrode catalyst of claim 8, wherein the amorphous carbon is outside of the crystal lattice structure of the tungsten carbide.

10. The electrode catalyst of claim 8, wherein the weight ratio of the palladium (Pd) to the first other metal to the second other metal is in the ratio range of about 66.7:33.2:0.1 to about 99.998:0.001:0.001.

11. The electrode catalyst of claim 8, wherein the metal catalyst comprises palladium (Pd) and at least one other metal selected from the group consisting of nickel (Ni) and iridium (Ir).

12. An electrode comprising the electrode catalyst of claim 8.

13. A fuel cell comprising the electrode of claim 12.

14. The fuel cell of claim 13, wherein the electrode is an anode.

\* \* \* \* \*